United States Patent [19]

Watkins et al.

[11] 4,421,189
[45] Dec. 20, 1983

[54] STAIR VEHICLE

[75] Inventors: Cecil J. Watkins, Hove; Simon R. Watkins, Southsea, both of England

[73] Assignee: Tobex Motivated Chair Company Limited, Hove, England

[21] Appl. No.: 358,745

[22] Filed: Mar. 16, 1982

[30] Foreign Application Priority Data

Mar. 17, 1981 [GB] United Kingdom ............... 8108224
Oct. 5, 1981 [GB] United Kingdom ............... 8130044

[51] Int. Cl.$^3$ .................................................. B62B 5/02
[52] U.S. Cl. ............................. 180/8 A; 180/DIG. 3; 280/5.2; 280/5.26; 280/DIG. 10
[58] Field of Search .................. 180/8 A, DIG. 3; 280/5.2, 5.26, DIG. 10

[56] References Cited

U.S. PATENT DOCUMENTS 2,400,824  5/1946  Jackson ........................ 180/8 A
2,736,564  2/1956  Loam et al. .................. 280/DIG. 10
3,283,839  11/1966  Brown et al. ................. 280/5.26

Primary Examiner—Joseph F. Peters, Jr.
Assistant Examiner—Kenneth R. Rice
Attorney, Agent, or Firm—Flynn, Thiel, Boutell & Tanis

[57] ABSTRACT

The vehicle—e.g. a wheelchair—has groups of wheels (10) mounted on a spider (9) for rotation about a central axis to enable the vehicle to ascend or descend stairs or steps. To reduce the risk of the vehicle rolling off the steps, each wheel has alongside it a foot member (further wheel 13), rigidly secured to the spider, with engagement portions (18) to engage the stair when the spider is tilted and clear portions (14) allowing free rolling when the spider is level. Also, a geared drive arrangement to the spider(s) is provided to give braking or restraint with a mechanical advantage. In a further embodiment the drive motor for rotating the spiders is mounted on a pivoted projecting arm or skid (27, FIG. 6) which transmit the motor or braking torque directly to the stairs to reduce the risk of the vehicle tipping.

11 Claims, 11 Drawing Figures

STAIR VEHICLE

BACKGROUND OF THE INVENTION

The present invention relates to a device for use in moving a load up or down a stepped path such as a staircase. It is particularly, though by no means exclusively, applicable to invalid chairs.

According to one aspect of the present invention there is provided a device for use in moving a load up or down a stepped path, comprising a structure for receiving the load, at least one support element rotatably mounted on the structure and having rotatably mounted thereon at least three symmetrically disposed wheels whereby, in use, the wheels cooperate with successive steps of the path, and foot means secured to each support element adjacent the corresponding wheel, the foot means being clear of the circumference of the wheel at two regions so that the wheel can roll freely on a plane when the support element is positioned with the wheel and respectively one or other of the adjacent wheels in contact with the plane, and having engagement portions located forwardly of the said two regions so as, when the support element is rotated forwardly of the said position, to engage the plane to prevent rolling movement.

Normally the clear regions will be disposed symmetrically on each side of a radius of the support member passing through the axis of the wheel in question; one engagement portion being on this radius and the other lying forwardly of the forwardmost of the two clear regions. "Forward" is with reference to the direction downwardly of the stepped path: where the device has a handle, usually the device will move up the path handle-first. If the device does not have a preferred direction, then naturally three engagement portions should be provided, respectively rearwardly, between, and forwardly of the two clear regions. Indeed, it may sometimes be convenient to provide three engagement portions even in devices having a preferred direction.

In one preferred arrangement, the foot means takes the form of a further wheel, non-rotatably mounted on the support member, coaxial with, said having a diameter equal to or slightly greater than, the rotatable wheel, the cutaway portions corresponding to the "clear" regions and circumferential or rim portions forming the said engagement portions.

In another aspect, the invention provides a device for use in moving a load up or down a stepped path, comprising a structure for receiving the load, at least one support element rotatably mounted on the structure and having rotatably mounted thereon at least three symmetrically disposed wheels whereby, in use, the wheels cooperated with successive steps of the path, and a rotatable member connected to the support element(s) by gearing means such that, in use the rotatable member rotates at a greater speed than the support element(s), whereby during movement down the stepped path, drag on the rotatable member provides, with a mechanical advantage, a restraining effect on rotation of the support elements.

The drag on the rotatable member may be provided by motor winding resistance and friction: indeed the member may simply be the rotor of a motor employed for driving the support member(s) during movement up the stepped path, or by brake drum or disc (which could be mounted on a common shaft with such a motor, or both). The motor braking can be enhanced by an electrically operated dynamic motor braking arrangement.

In a further aspect the invention provides a device for use in moving a load up or down a stepped path, comprising a structure for receiving the load, at least one support element rotatably mounted on the structure and having rotatably mounted thereon at least three symmetrically disposed wheels whereby, in use, the wheels cooperate with successive steps of the path, and a motor arranged to drive the support element(s), the motor being pivotally mounted about an axis substantially coincident with that of the support element(s), and an elongate forwardly extending stabilizing element secured for pivotal movement together with the motor so as, in use, to bear on the stepped path.

Although it is possible to employ only one support element, for many applications this will create problems of balance, and the use of two support elements is preferred. More than two may be provided, but this will not usually be necessary.

Preferably the or each support element is a "spider" having radially extending symmetrical arms each carrying a respective wheel. Four wheels are preferred.

Where there are two support elements, these may be rigidly secured to a common axle which is rotatably secured to the structure.

Preferably also the structure includes a handle for the person moving the load, for steering and guiding the load.

As previously mentioned, the invention may be applied to invalid chairs, and thus also provides a device of the type described above including a seat for receiving a patient.

BRIEF DESCRIPTION OF THE DRAWINGS

Some embodiments of the invention will now be described by way of example with reference to the accompanying drawings in which.

DETAILED DESCRIPTION

Figure 1:
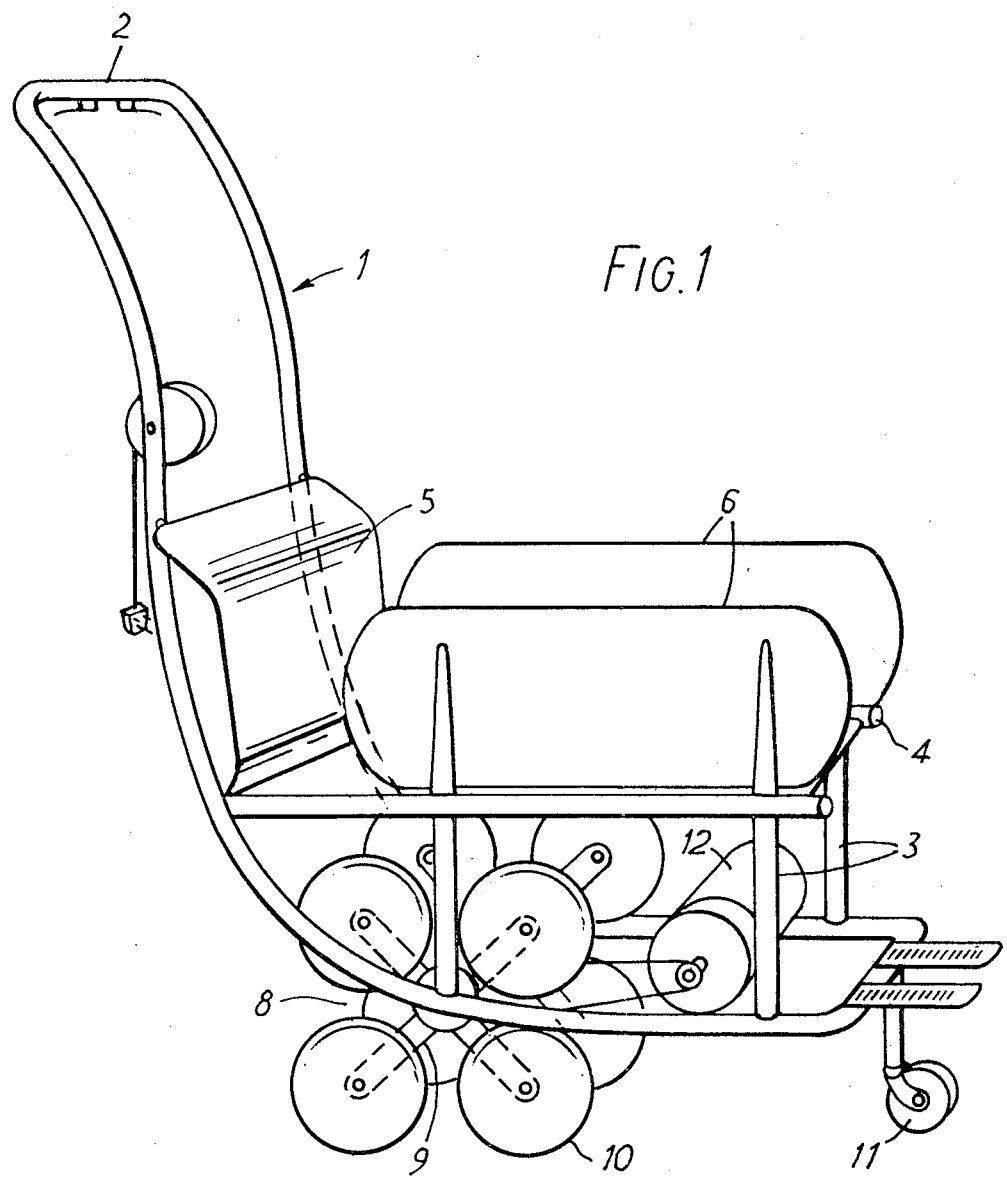
FIG. 1 is a perspective view of one embodiment of an invalid chair according to the present invention.

The invalid chair shown in FIG. 1 has a frame 1 of welded tubular steel construction with an integral handle 2. Frame members 3 carry a seat 4 for the patient, and a backrest 5 is also provided. The seat 4 has side panels 6 to each side to assist the security of the patient, especially for non-walking patients. Each side panel may be mounted on hinged plugs resting in the tubular upright members of the steel framework, which, in the upright position firmly enclose a knuckle type hinge, but when the panel is raised an inch or so, permit the whole side panel to lay over level with the seat—being returned to its upright position just as easily. Hinged foot rests are also provided, which can fold up into a vertical position when not in use.

Figure 2:
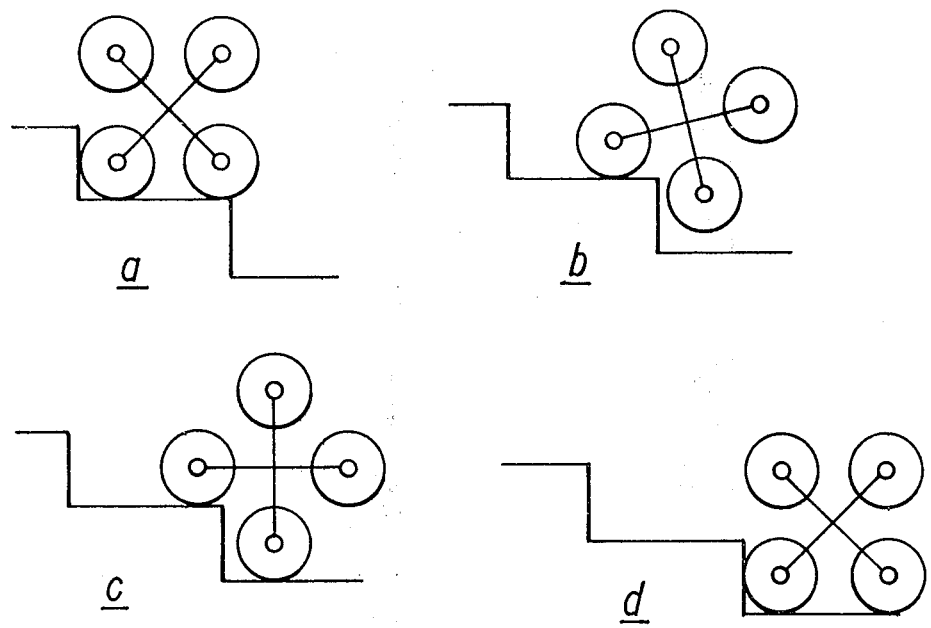
FIGS. 2a–2d are schematic views illustrating the operation of the device.

Support elements 7 each in the form of a "spider" are secured one to each end of an axle (not visible in FIG. 1) mounted to the frame by means of bearings 8. Each spider 7 has four radially extending symmetrically disposed arms 9, and a wheel 10 is rotatably secured to the end of each arm. The chair also has one or more front wheels 11. When the chair is to be taken up or down stepped path such as a staircase, the device proceeds downstairs (for example) as shown in FIG. 2, in the sequence a-b-c-d. The sequence is, of course, reversed when proceeding upstairs. FIG. 2a envisages stairs or steps of a width such that two wheels can rest on the stair or steps simultaneously: this is not, however, essential to the operation of the device, and with relatively narrow stairs the spider can rotate from the position shown in FIG. 2c to that shown in FIG. 2b without the leading wheel coming into contact with the stair.

A motor 12 (FIG. 1) may be provided to assist the climbing of stairs, the motor being arranged to rotate the axle upon which the spiders 7 are mounted, and being supplied from the domestic electrical supply via a flexible cable, on/off switch and hand grip control, although battery operation is of course equally possible. The motor drive may be by means of a free-wheel device to provide for automatic disengagement of the motor when travelling upstairs without power. In addition, damping or braking means are provided to provide a degree of restraint during downstairs movement, thereby relieving the person controlling the device of the need to support most of the weight of the load and thus reducing the risk of the device and load falling down the stairs in an uncontrolled and dangerous manner.

The drive between the motor (12) and the axle is by means of a gearbox and a sprocket and chain drive (of, say, 3:1 reduction): the overall gear ratio may typically be 60:1. Thus a substantial degree of resistance is obtained, via the large gear ratio, due to the motor drag (such as winding resistance and friction).

A further braking effect can be obtained by means of a brake disc or drum secured to the motor shaft, with a brake caliper or brake shoes which can be operated by means of a Bowden cable from a second hand grip mounted on the handle. The high rear ratio permits a substantial braking effect using a small brake drum or disc, without requiring a large operating force, even with a heavy patient. Additionally, or, instead, the motor can be arranged to effect dynamic braking electrically. Various methods of dynamic braking of electric motors are known, and do not need to be described here in detail. One preferred method, however, is to provide for the motor to operate in reverse (indeed, this may be desirable in itself since with high gear ratios it is possible that the weight of the chair may be insufficient-when emtpy-to turn the motor over): any tendency to overrun being counteracted by generator action of the motor.

An alternative when employing an a.c. induction motor is to provide an auxiliary d.c. supply (typically, for a 240 V a.c. motor of about 30 V) which can be applied to the (stator) windings of the motor, energy being dissipated as heat in the rotor. The dissipation is not large, and of limited duration, but can provide a 30 or 40% increase in the damping effect. This additional braking facility can be switched on by providing an additional position on the main on-off switch: if desired, it can be controlled by the operator using the hand grip control used for controlling the motor during upward (powered) movement. Having descenced a flight of stairs, it is then merely necessary for the operator to return the main switch to the ascending position, for the chair to be driven upwards, as previously described. Thus it will be noted that the operator can descend the stairs with a permanent damper as described above, may actuate an electrical damper and/or a hand-brake, and is in complete control of the chair as it descends, stopping at any time. To return he may switch the main switch to "ascend", without any effort other than that required to guide the chair: by release of the drive (grip) he can immediately stop the motor, and hold the chair in position by using the alternative brake grip.

Figure 4:
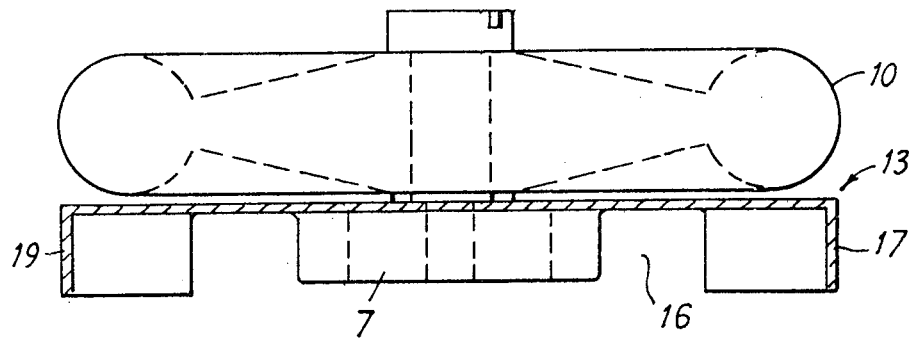
FIGS. 4 and 5 show the further wheel.
Figure 5:
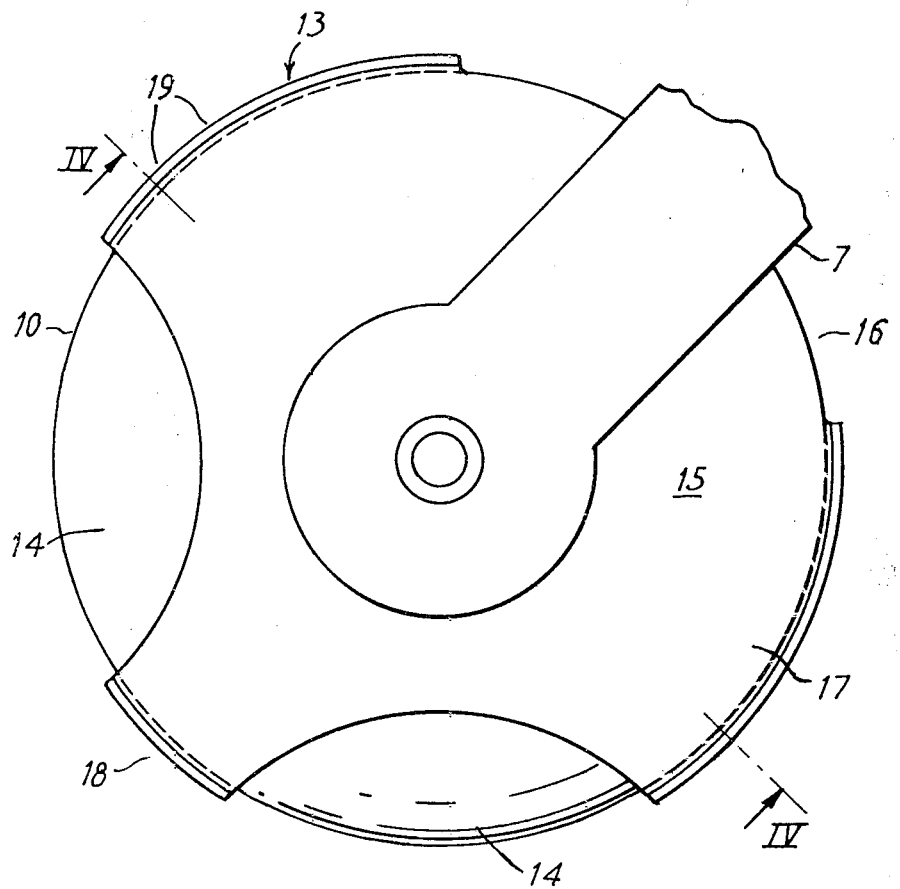

However, restraining arrangements of this type, although serving to restrain rotation of the spiders 7, still permit free rotation of the wheels 10 which are freely mounted on the arms of the spiders. Thus the chair still has a relative freedom of movement down the staircase. In order to reduce this, each wheel has, mounted alongside it, foot means in the form of a further wheel 13 of the same or possibly slightly greater diameter, as show in FIGS. 3, 4 and 5.

Each of these further wheels 13 is of generally circular shape, but has a pair of arcuate cut-away portions 14. As shown, the further wheel 13 consists of a steel disc 15 with a circumferential rim. The rim is omitted in the cut-away regions 14, and also has a gap to fit around the arm of the spider so as to leave three engagement portions 17, 18, 19. However, neither the form or construction nor the material of the further wheel is critical: in practice, a circumferential covering or tyre of rubber or other suitable material may be provided to prevent damage to floor coverings etc.

Figure 3:
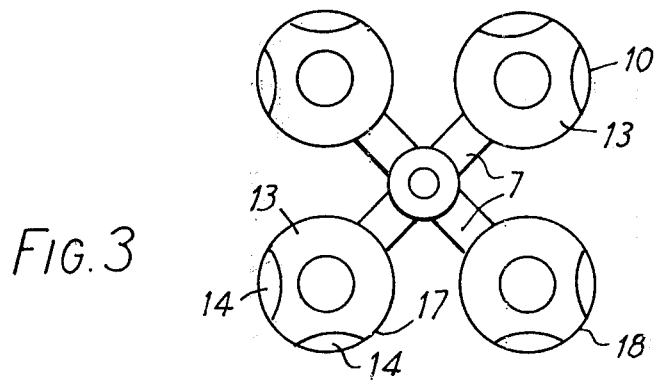
FIG. 3 is a view of the wheel assembly.

The further wheels 13 are rigidly secured to the spider 7, and the cut-out regions 14 are disposed in the manner indicated in FIG. 3: i.e. (for a four-arm spider) each cut-away portion is centred on a radius from the wheel lying at an angle of 45° to the spider arm on which the wheel is mounted. As a result, when the chair is on a level surface, or on a staircase with the spider in the position shown in FIG. 2a, the wheels 10 are in contact with the horizontal surface and the chair can move freely. However, when the chair moves downward and forward to the position shown in FIG. 2b, the further wheel 13 on the trailing arm of the spider rotates along with the spider so that the leading engagement portion 17 of its circumference comes into contact with the stair and prevents further rolling on the wheel 10. Similarly, in the position shown in FIG. 2c, the central engagement portion 18 of the further wheel 13 again prevents rolling.

Figure 6:
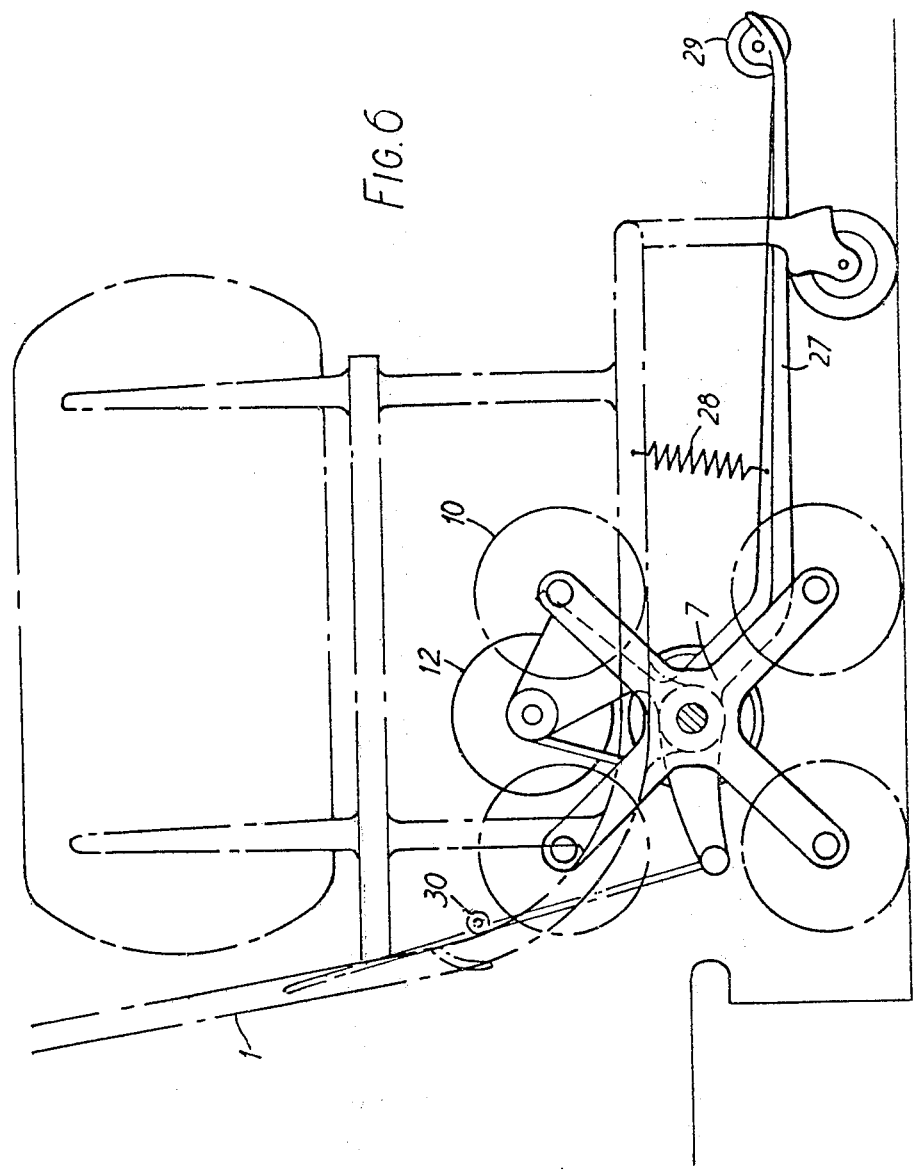
FIGS. 6, 7 and 8 illustrate a further embodiment.
Figure 7:
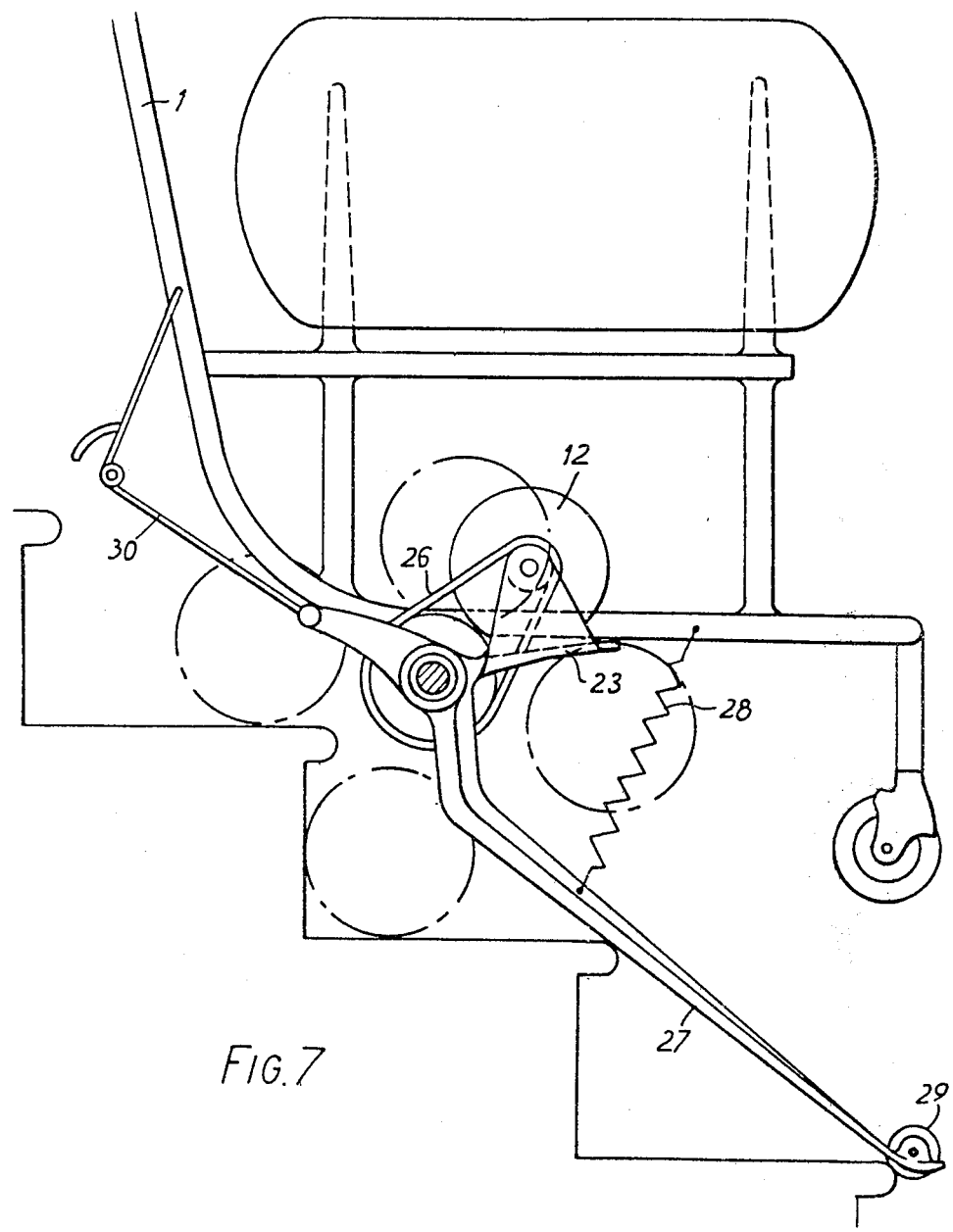
Figure 8:
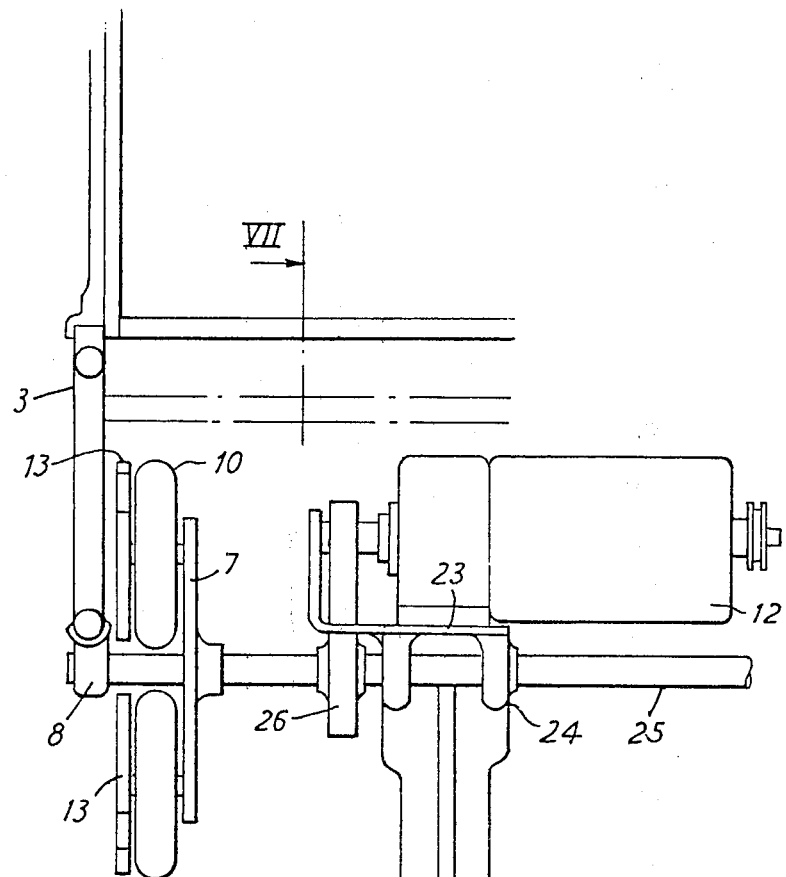

In the embodiment of the invention shown in FIGS. 6, 7 and 8, the motor 12 is not secured to the frame 1 of the chair as in FIG. 1, but mounted on a bracket 23 pivotally mounted by bearings or bushes 24 on the axle 25. Drive from the motor 12 (which has an integral gearbox) is by means of a sprocket chain drive 26 to the axle 25. It will be appreciated that when the chair is travelling upstairs, the motor exerts an anti-clockwise torque (as viewed in FIG. 6) on the spider 7 and a corresponding clockwise torque on the motor mounting. If the motor is secured directly to the chair frame, this produces a tendency for the chair to tip in the downstairs direction, and this has to be countered by a corresponding force on the handle 2 by the person controlling the chair. In order to avoid this, the motor torque is restrained by means of a skid 27 integral with the bracket 23. When the chair is travelling on level ground, the motor not being in use, the skid is held by means of a return spring 28 in the position shown in FIG. 6. When travelling upstairs, however, as shown in FIG. 7 the initial motor movement rotates the bracket 23 and skid 27 clockwise (as viewed in the drawing), against the action of the return spring 28 to the position shown in FIG. 7 until the skid bears against the staircase. Thus the necessary reaction force for the motor is provided by the contact between the skid and the staircase, and there is no tendency for the chair itself to tip. The skid may be provided with a lead wheel 29. Also, a manually lockable strut 30 may be provided to secure the skid in position when not required. When descending stairs, where the motor is being used for braking purposes, or where a brake of damper is mounted on the bracket with the motor, the skid provides a similar stabilising effect.

We claim:

1. A device for use in moving a load up or down a stepped path, comprising a structure for receiving the load, at least one support element rotatably mounted on the structure and having rotatably mounted thereon at least three symmetrically disposed wheels whereby, in use, the wheels cooperate with successive steps of the path, and foot means secured to each support element adjacent the corresponding wheel, the foot means being clear of the circumference of the wheel at two regions so that the wheel can roll freely on a plane when the support element is positioned with the wheel and respectively one or other of the adjacent wheels in contact with the plane, and having engagement portions located forwardly of the said two regions so as, when the support element is rotated forwardly of the said position, to engage the plane to prevent rolling movement.

2. A device according to claim 1, in which the clear regions are disposed symmetrically on each side of a radius of the support member passing through the axis of the associated wheel, one engagement portion lying on this radius and the other lying forwardly of the forwardmost of the two clear regions.

3. A device according to claim 2, in which a third engagement portion is provided, positioned rearwardly of the rearward clear region.

4. A device according to claim 1, 2 or 3, in which each foot means comprises a further wheel non-rotatably mounted on the support member.

5. A device according to claim 1, further including a rotatable member connected to the support element by gearing means such that, in use the rotatable member rotates at a greater speed than the support element, whereby, during movement down the stepped path, drag on the rotatable member provides, with mechanical advantage, a restraining effect or rotation of the support element.

6. A device according to claim 1, in which the or each support element is a spider having radially extending symmetrical arms each carrying a respective wheel.

7. A device according to claim 5, in which the rotatable member comprises a brake drum or disc.

8. A device according to claim 5, in which the rotatable member comprises the rotor of a motor arranged for driving the support member during movement up the stepped path.

9. A device according to claim 8, including electrical control means operable to cause the motor to exert braking torque.

10. A device according to claim 1, including a motor arranged to drive the support element, the motor being pivotally mounted about an axis substantially coincident with that of the support element, and an elongate forwardly extending stabilizing element secured for pivotal movement together with the motor so as, in use, to bear on the stepped path.

11. A device according to claim 1 including a seat for receiving a patient.

* * * * *